(12) United States Patent
Feng

(10) Patent No.: US 10,663,394 B1
(45) Date of Patent: May 26, 2020

(54) OPTICAL DEVICES FOR SENSING GAS

(71) Applicant: Advanced Semiconductor Engineering, Inc., Kaohsiung (TW)

(72) Inventor: Shih-Tien Feng, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 16/239,325

(22) Filed: Jan. 3, 2019

(51) Int. Cl.
*G01N 21/25* (2006.01)
*G01N 21/3504* (2014.01)
*G02B 6/42* (2006.01)

(52) U.S. Cl.
CPC ....... *G01N 21/255* (2013.01); *G01N 21/3504* (2013.01); *G02B 6/4214* (2013.01); *G01N 2201/0636* (2013.01)

(58) Field of Classification Search
CPC .. G01N 21/25; G01N 21/255; G01N 21/3504; G02B 6/4214
USPC .......................................................... 356/437
See application file for complete search history.

(56) References Cited

U.S. PATENT DOCUMENTS

| | | | | |
|---|---|---|---|---|
| 7,200,288 | B2 * | 4/2007 | Ogura | G06K 9/00013 382/321 |
| 10,307,090 | B2 * | 6/2019 | Rudnnann | G01N 33/4925 |
| 2005/0270536 | A1 * | 12/2005 | Ludwig | G01J 3/02 356/437 |
| 2006/0132777 | A1 * | 6/2006 | Hubble, III | G01J 3/10 356/402 |
| 2009/0296771 | A1 * | 12/2009 | Boehm | G01N 21/552 374/19 |
| 2016/0151009 | A1 * | 6/2016 | Rudmann | G01N 33/4925 600/322 |

* cited by examiner

*Primary Examiner* — Roy M Punnoose
(74) *Attorney, Agent, or Firm* — Foley & Lardner LLP

(57) ABSTRACT

An optical device includes a carrier, a light source, a die, a light guiding structure and a reflecting structure. The carrier has a surface. The light source is disposed on the surface and configured to emit a light beam. The die is disposed on the surface and configured to sense the light beam. The light guiding structure is disposed on the surface and configured to guide the light beam. The light guiding structure includes a light receiving surface facing the light source and a light exit surface. The reflecting structure is disposed over the die. The reflecting structure includes a light reflecting surface facing the light exit surface of the light guide structure and is configured to reflect the light beam exiting from the light exit surface to the die. The light reflecting surface and the light exit surface are separated from each other and define a vent hole.

20 Claims, 6 Drawing Sheets

OPTICAL DEVICES FOR SENSING GAS

BACKGROUND

1. Technical Field

The present disclosure relates to an optical device. In particular, the present disclosure relates to an optical device having a smaller package size.

2. Description of the Related Art

A comparative optical device for gas sensing usually uses a reflecting structure. The long path of the light beam and the greater thickness of the package of the optical device are not desirable. However, it is difficult to form a smaller package size for the optical device.

SUMMARY

In an aspect, an optical device comprises a carrier, a light source, a die, a light guiding structure and a reflecting structure. The carrier has a surface. The light source is disposed on the surface and configured to emit a light beam. The die is disposed on the surface and configured to sense the light beam. The light guiding structure is disposed on the surface and configured to guide the light beam. The light guiding structure comprises a light receiving surface facing the light source and a light exit surface. The reflecting structure is disposed over the die. The reflecting structure comprises a light reflecting surface facing the light exit surface of the light guide structure and is configured to reflect the light beam exiting from the light exit surface to the die. The light reflecting surface and the light exit surface are separated from each other and define a vent hole.

In an aspect, an optical device comprises a carrier, a light source, a reflecting structure, a light guiding structure and a die. The carrier has a surface. The light source is disposed on the surface. The light guiding structure, the carrier and the reflecting structure define a chamber with a vent hole. The die is disposed within the chamber.

BRIEF DESCRIPTION OF THE DRAWINGS

Common reference numerals are used throughout the drawings and the detailed description to indicate the same or similar elements. Embodiments of the present disclosure will be more apparent from the following detailed description taken in conjunction with the accompanying drawings.

DETAILED DESCRIPTION

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

Figure 1A:
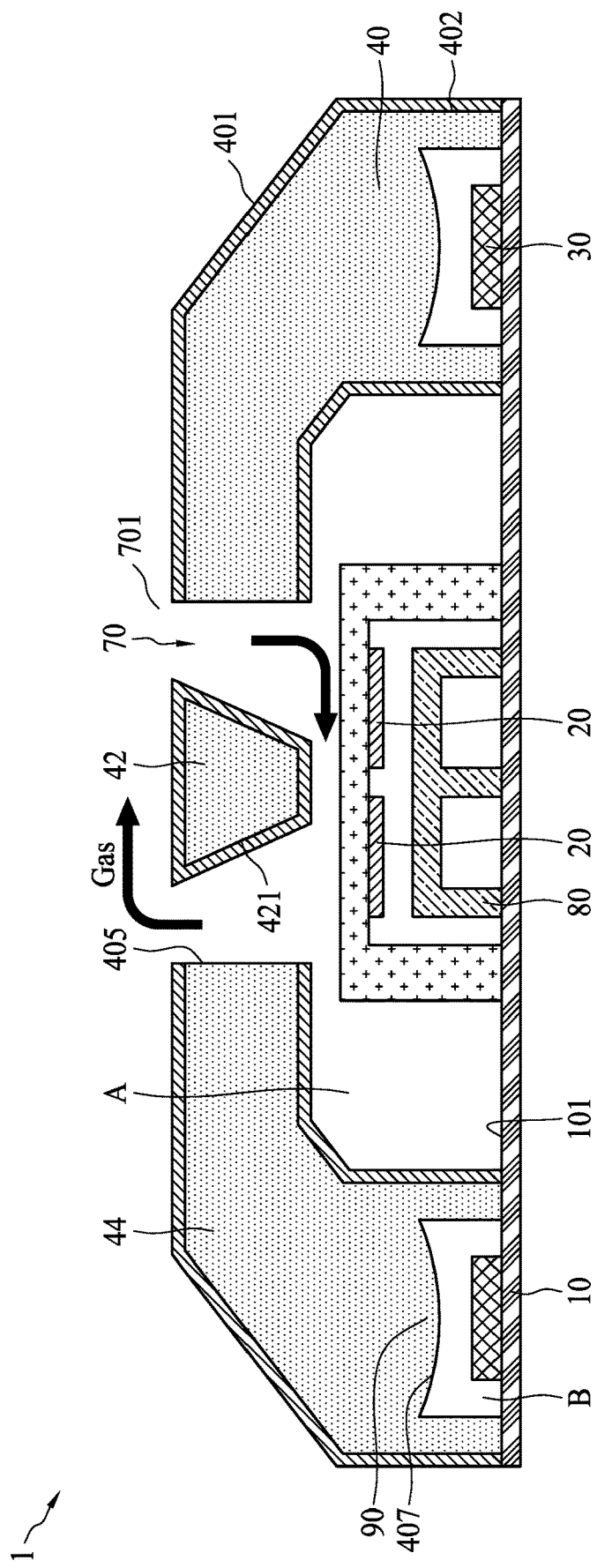
FIG. 1A is a cross-sectional view of an optical device in accordance with an embodiment of the present disclosure.

FIG. 1A is a cross-sectional view of an optical device 1 in accordance with an embodiment of the present disclosure. The optical device 1 includes a carrier 10, a light source 30, a die 20, a die 80, a light guiding structure 40 and a reflecting structure 42. In some embodiments, the light source 30 and a light guiding structure 40 are disposed over the carrier 10. The carrier 10 may include a substrate such as a semiconductor substrate, a circuit board, or the like. The carrier 10 has a surface 101. In one or more embodiments, the surface 101 may be a top surface. In one or more embodiments, conductive wirings (not shown) are disposed over or are embedded in the carrier 10. In some embodiments, the package height (size) of the optical device 1 may range, but is not limited to be, from about 1.9 millimeter (mm) to about 2.1 mm.

The light source 30 is disposed on the surface 101 of the carrier 10. The light source 30 is configured to emit a light beam toward a light receiving surface 407. The die 20 is disposed on the surface 101 of the carrier 10. The die 20 is configured to sense the light beam from the light source 30. In one or more embodiments, the die 20 includes an optical sensor chip. In some embodiments, the die 20 includes, but is not limited to, a gas sensing chip. In some embodiments, the die 20 may be formed having complementary-metal-oxide-semiconductor (CMOS) sensors, charge-coupled device (CCD) sensors or other suitable sensors to sense light. In some embodiments, the die 80 includes, but is not limited to, a thermopile chip. The light source 30 may include a light emitting diode (LED), or other suitable light sources able to emit light. In some embodiments, the light source 30 may emit the infrared ray.

The light guiding structure 40 is disposed on the surface 101 of the carrier 10. The light guiding structure 40 is configured to guide the light beam. The light guiding structure 40 includes the light receiving surface 407 and a light exit surface 405. The light receiving surface 407 faces the light source 30. In some embodiments, the light receiving surface 407 includes a curved surface configured as a lens structure 90 for receiving the light beam. The lens structure 90 faces the light source 30. The light guiding structure 40 includes the light receiving surface 407 spaced from the light source 30 with a gap. The light exit surface 405 is exposed from a vent hole 70. In some embodiments, the light exit surface 405 may have a selectively plated metal layer. In some embodiments, the light exit surface 405 may be grinded to remove the metal layer. The light guiding structure 40 having the light exit surface 405 and the reflecting structure 42 for reflecting the light beam can be used to shorten the path of the light beam and reduce the thickness of the package of the optical device 1.

In some embodiments, the light guiding structure 40 includes a non-air medium or a transparent material. In some embodiments, the light guiding structure 40 includes, but is not limited to, a molding compound or glass. The light guiding structure 40 and the carrier 10 together define a chamber A with one or more vent holes 70. The dies 20 and 80 are disposed within the chamber A.

In some embodiments, the light exit surface 405 may include a light transmitting facet. The light guiding structure 40 includes a light permeable body 44 and a reflecting layer 401 disposed on an outer surface 402 of the light permeable body 44. The light beam is reflected by the reflecting layer 401 outside the light permeable body 44. The permeable body 44 and the reflecting layer 401 form a total reflection structure. The light beam is transmitted in the light permeable body 44 by total reflection. The light guiding structure 40 which is formed with a non-air medium can guide the light beam by the reflecting layer 401 disposed on the outer surface 402 of the light permeable body 44.

The reflecting structure 42 is disposed over the die 20. The reflecting structure 42 includes a light reflecting surface 421. In some embodiments, a reflecting layer 401 is disposed on the light reflecting surface 421. The light reflecting surface 421 of the reflecting structure 42 is sloped with respect to the surface 101. The light reflecting surface 421 of the reflecting structure 42 which is sloped toward the surface 101 can reflect the light beam to the die 20 and shorten the path of the light beam. The light reflecting surface 421 faces the light exit surface 405 of the light guide structure 40. The light reflecting surface 421 is configured to reflect the light beam exiting from the light exit surface 405 to the die 20. The angle of the light reflecting surface 421 may be, for example, ranging from about 10 degrees to about 80 degrees, or from about 30 degrees to about 60 degrees, depending on the position of the die 20 relative to the reflecting structure 42. The light reflecting surface 421 and the light exit surface 405 are separated from each other.

The reflecting layer 401 on the light reflecting surface 421 may be, or may include, polished metal materials, plastic materials with a metal coating, or other suitable reflective materials. Examples of polished metal materials or metal coatings include aluminum (Al), copper (Cu), gold (Au), or silver (Ag), or an alloy thereof, or other suitable metals or alloys. The reflecting layer 401 increases reflectance of the light reflecting surface 421.

The light reflecting surface 421 and the light exit surface 405 together define a vent hole 70. In some embodiments, a number of the vent hole 70 is at least one or more. In some embodiments, the light guiding structure 40 and the carrier 10 together define a space B. The light source 30 is located within the space B. In some embodiments, a gas to be determined flows into the chamber A through the vent hole 70. The gas will be interactive with the light beam emitted from the light exit surface 405 at a gas and light interactive area 701. The area may cover the path of the light beam emitted from the light exit surface 405 to the light reflecting surface 421. The specific wavelength of the light beam may be absorbed by the gas to be determined. In some embodiments, the die 20 may determine the species and concentration of the gas by sensing the light beam after the interaction.

The optical device or structure depicted in the following drawings are similar in some ways to the optical device 1 of FIG. 1A, and some same-numbered components are not described again with respect to the following drawings.

Figure 1B:
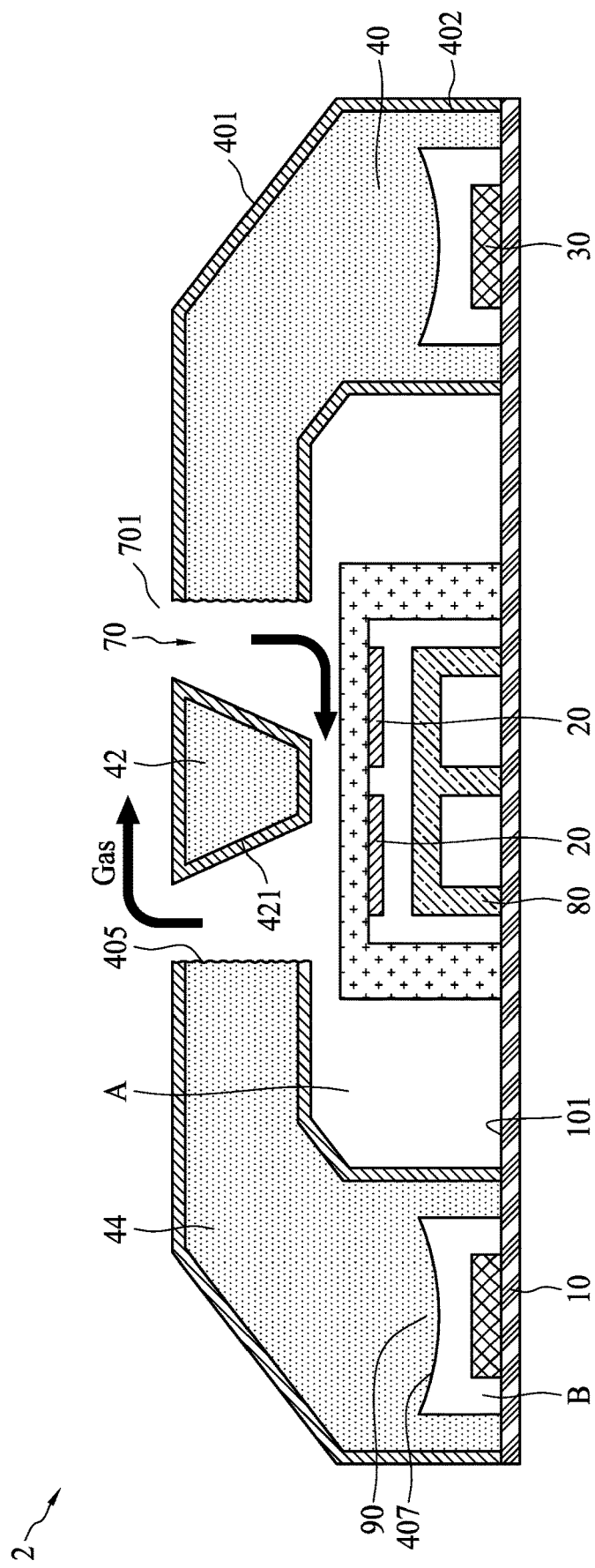
FIG. 1B is a cross-sectional view of an optical device in accordance with an embodiment of the present disclosure.

FIG. 1B is a cross-sectional view of an optical device 2 in accordance with an embodiment of the present disclosure. The structure of the optical device 2 of FIG. 1B is similar to the structure of the optical device 1 of FIG. 1A. The optical device 2 includes a carrier 10, a light source 30, a die 20, a die 80, a light guiding structure 40 and a reflecting structure 42. In some embodiments, the light exit surface 405 includes a light diffusion structure. The light diffusion structure is configured to diffuse or scatter the light beam such that the light beam can interact with the gas more efficiently. By way of example, the light diffusion structure may include a roughness surface of the light exit surface 405. The rough surface of the light exit surface 405 may be formed by molding, treatment such as chemical and/or mechanical treatment or other suitable technique.

Figure 2:
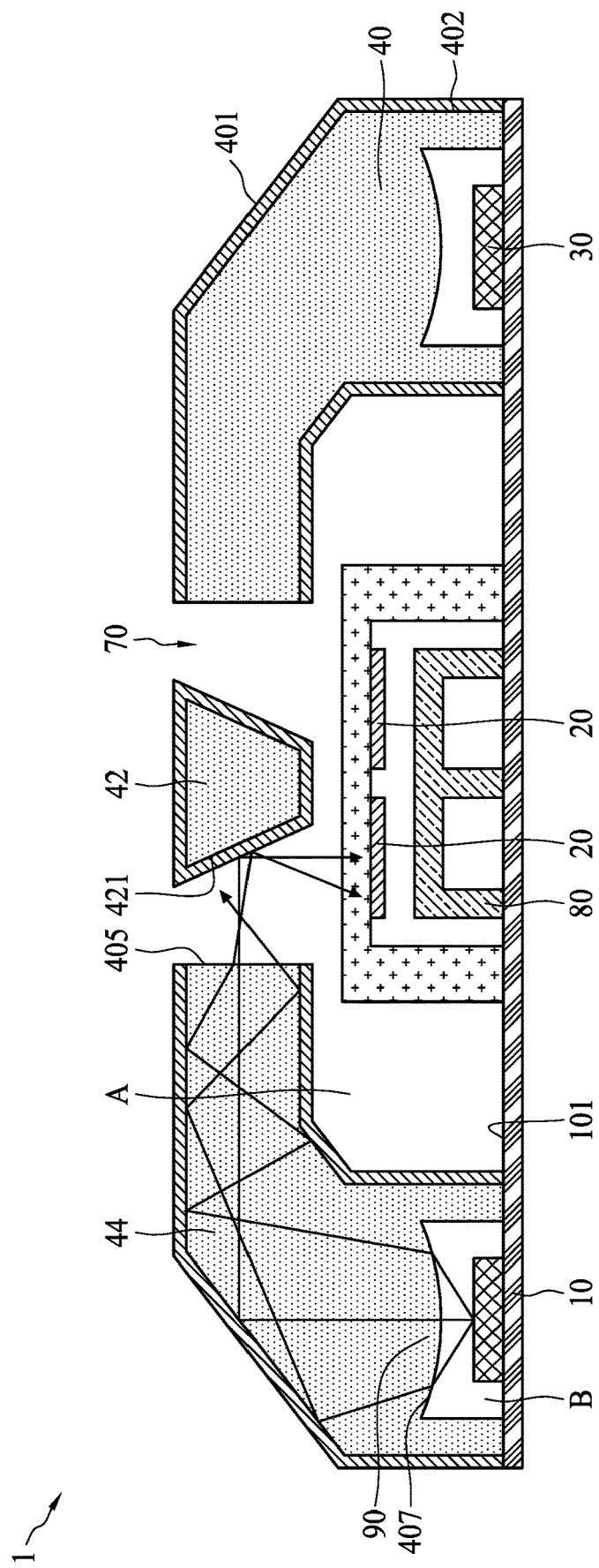
FIG. 2 is a cross-sectional view of an optical device showing the path of the light beam in accordance with an embodiment of the present disclosure.

FIG. 2 is a cross-sectional view of an optical device 1 showing the path of the light beam in accordance with an embodiment of the present disclosure. In some embodiments, the paths of the light beam are illustrated as the arrows. The path of the light beam is emitted from the light source 30 to the die 20. The light beam emitted from the light source 30 will be converged by the lens structure 90. The lens structure 90 may reduce the loss of the light energy of the light beam. The reflecting layer 401 reflects and converges the light beam from the light source 30. In some embodiments, the light beam may be transmitted in the light permeable body 44 by total reflection. The light beam is transmitted through the light exit surface 405 and passes through the vent hole 70. Next, the light beam is reflected by the reflecting layer 401 and the reflected light beam may be emitted toward the die 20. In some embodiments, the light beam may be reflected by the light reflecting surface 421.

Figure 3:
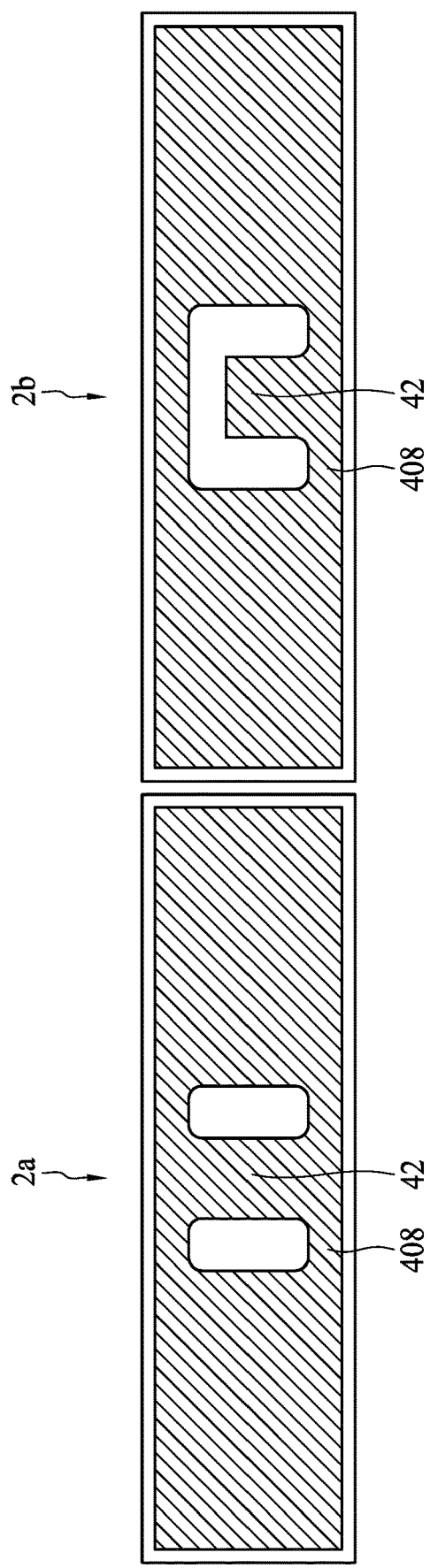
FIG. 3 illustrates top views of an optical device in accordance with an embodiment of the present disclosure.

FIG. 3 illustrates top views 2a and 2b of an optical device 1 in accordance with an embodiment of the present disclosure. The top view 2a shows two vent holes 70 separated from each other. The optical device 1 includes a connection structure 408 for connecting the reflecting structure 42 to the light guiding structure 40. In some embodiments, the light guiding structure 40 and reflecting structure 42 are formed integrally. The top view 2b shows two vent holes 70 communicated with each other.

Figure 4:
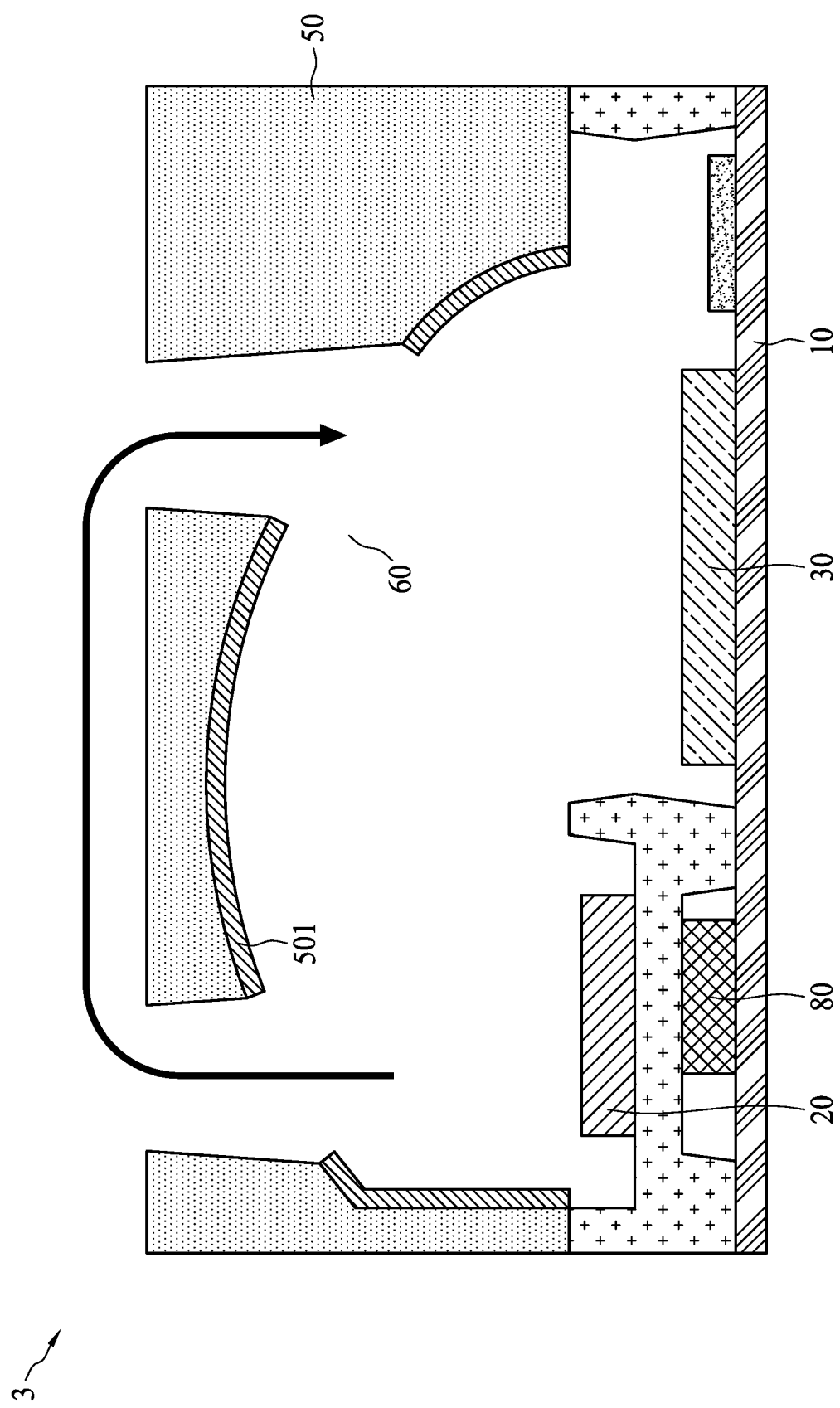
FIG. 4 is a cross-sectional view of an optical device in accordance with an embodiment of the present disclosure.

FIG. 4 is a cross-sectional view of an optical device 3 in accordance with an embodiment of the present disclosure. The optical device 3 includes a carrier 10, a light source 30, a die 20, a die 80, a cover structure 50 and a reflecting structure 501. The carrier 10 may include a substrate such as a semiconductor substrate, a circuit board, or the like. In one or more embodiments, conductive wirings (not shown) are disposed over or are embedded in the carrier 10.

The die 20 is disposed above the carrier 10. The die 20 is configured to sense the light beam from the light source 30. In one or more embodiments, the die 20 includes an optical sensor chip. In some embodiments, the die 20 includes, but is not limited to, a gas sensing chip. In some embodiments, the die 20 may be formed having CMOS sensors, CCD sensors or other suitable sensors to sense light. In some embodiments, the die 80 includes, but is not limited to, a thermopile chip.

A path 60 of the light beam is emitted from the light source 30 to the die 20. The light beam is reflected by the reflecting structure 501. The light source 30 may include an LED, or other suitable light sources able to emit light. In some embodiments, the light source 30 may emit the infrared ray. In some embodiments, a gas to be determined flows into the chamber through the vent hole 70. The gas will be interactive with the light beam emitted from the light source 30. The specific wavelength of the light beam may be absorbed by the gas to be determined. In some embodiments, the die 20 may determine the species and concentration of the gas by sensing the light beam after the interaction. In some embodiments, the package height (size) of the optical device 3 ranges from about 3.9 mm to about 4.1 mm. In comparison with the optical device 3, the package height of the optical device 1 may be reduced due to the total reflection of the light beam transmitted in the light guiding structure 40.

Figure 5:
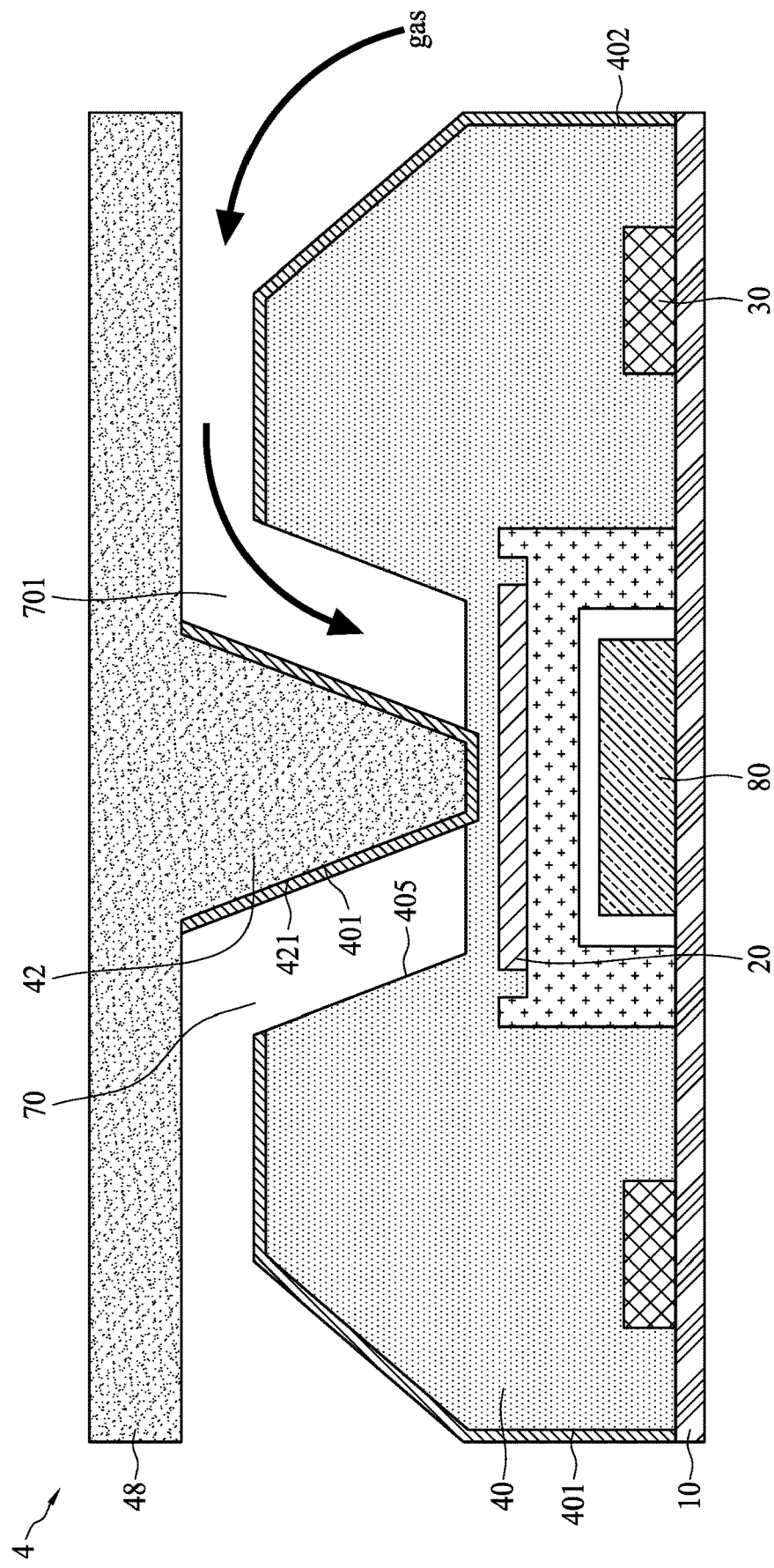
FIG. 5 is a cross-sectional view of an optical device in accordance with an embodiment of the present disclosure.

FIG. 5 is a cross-sectional view of an optical device 4 in accordance with an embodiment of the present disclosure. The optical device 4 includes a carrier 10, a light source 30, a die 20, a die 80, a light guiding structure 40 and a cover structure 48. In some embodiments, the light source 30 and a light guiding structure 40 are disposed over the carrier 10. The carrier 10 may include a substrate such as a semiconductor substrate, a circuit board, or the like. In one or more embodiments, conductive wirings (not shown) are disposed over or are embedded in the carrier 10. The dies 20 and 80 are disposed on the carrier 10. The die 20 is configured to sense the light beam from the light source 30. In one or more embodiments, the die 20 includes an optical sensor chip. In some embodiments, the die 20 includes, but is not limited to, a gas sensing chip. In some embodiments, the die 80 includes, but is not limited to, a thermopile chip. In some embodiments, the light source 30 may emit the infrared ray.

The light guiding structure 40 is configured to guide the light beam. In some embodiments, the light guiding structure 40 includes a non-air medium or a transparent material. In some embodiments, the light guiding structure 40 includes, but is not limited to, a molding compound or glass. The light guiding structure 40 includes a light permeable body 44 and a reflecting layer 401 disposed on an outer surface 402 of the light permeable body 44. The light guiding structure 40 which is formed with a non-air medium can guide the light beam by the reflecting layer 401 disposed on the outer surface 402 of the light permeable body 44.

The light source 30 is configured to emit a light beam. The light beam is reflected by the reflecting layer 401. The cover structure 48 is disposed over the die 20. In one or more embodiments, the cover structure 48 is disposed over the light guiding structure 40. The reflecting structure 42 is protruded from the cover structure 48 toward the die 20.

In some embodiments, a reflecting layer 401 is disposed on the reflecting structure 42 of the cover structure 48. The protruding portion of the cover structure 48 which is sloped toward the carrier 10 can reflect the light beam to the die 20 and shorten the path of the light beam.

In some embodiments, a gas to be determined flows into the vent hole 70. The gas will be interactive with the light beam emitted from the light exit surface 405 at a gas and light interactive area 701. The specific wavelength of the light beam may be absorbed by the gas to be determined. In some embodiments, the die 20 may determine the species and concentration of the gas by sensing the light beam after the interaction.

In some embodiments of the present disclosure, the light guiding structure having the light exit surface and the reflecting structure for reflecting the light beam can be used to shorten the path of the light beam and reduce the thickness of the package of the optical device. The light exit surface includes a light diffusion (roughness) structure having a function of a light diffuser. The permeable body and the reflecting layer form a total reflection structure. The light guiding structure which is formed with a non-air medium can guide the light beam by the reflecting layer disposed on the outer surface of the light permeable body. The light reflecting surface of the reflecting structure which is sloped toward the surface can reflect the light beam to the die and shorten the path of the light beam. The reflecting layer reflects and converges the light beam from the light source.

As used herein, the terms "approximately" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For another example, a first angle may be approximately the same as a second angle if a difference between the first angle and the second angle is less than or equal to ±10°, such as ±5°, ±4°, ±3°, ±2°, ±1°, ±0.5°, ±0.1°, or ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical sensing device, comprising:
   a carrier having a surface;
   a light source disposed on the surface, and configured to emit a light beam;
   a die disposed on the surface, and configured to sense the light beam;
   a light guiding structure disposed on the surface and configured to guide the light beam, the light guiding structure comprising a light receiving surface facing the light source, and a light exit surface; and
   a reflecting structure disposed over the die, the reflecting structure comprising a light reflecting surface facing the light exit surface of the light guide structure, and configured to reflect the light beam exiting from the light exit surface to the die, wherein the light reflecting surface and the light exit surface are separated from each other and define a vent hole.

2. The optical sensing device of claim 1, wherein a number of the vent hole is at least one or more.

3. The optical sensing device of claim 1, wherein the light guiding structure comprises a non-air medium.

4. The optical sensing device of claim 1, wherein the light exit surface has a light diffusion structure.

5. The optical sensing device of claim 1, wherein the light guiding structure and the carrier define a space, and the light source is located within the space.

6. The optical sensing device of claim 1, wherein the light receiving surface comprises a curved surface configured as a lens for receiving the light beam.

7. The optical sensing device of claim 1, wherein the light reflecting surface of the reflecting structure is sloped with respect to the surface.

8. The optical sensing device of claim 1, wherein the die comprises a gas sensing chip.

9. The optical sensing device of claim 8, wherein the die comprises a thermopile chip.

10. The optical sensing device of claim 1, wherein the light guiding structure comprises a light permeable body and a reflecting layer disposed on an outer surface of the light permeable body, and the light beam is reflected by the reflecting layer inside the light permeable body.

11. The optical sensing device of claim 1, further comprising a connection structure connecting the reflecting structure to the light guiding structure.

12. The optical sensing device of claim 1, further comprising a cover disposed over the light guiding structure, wherein the reflecting structure is protruded from the cover toward the die.

13. An optical sensing device, comprising:
   a carrier having a surface;
   a light source disposed on the surface, and configured to emit a light beam;
   a die disposed on the surface, and configured to sense the light beam;
   a light guiding structure disposed on the surface and configured to guide the light beam, the light guiding structure comprising a light receiving surface facing the light source, and a light exit surface, wherein the light guiding structure comprises a non-air medium; and
   a reflecting structure disposed over the die, wherein the reflecting structure and light guiding structure together define a vent hole.

14. The optical sensing device of claim 13, wherein a number of the vent hole is at least one or more.

15. The optical sensing device of claim 13, wherein the light guiding structure and the carrier define a space, and the light source is located within the space.

16. The optical sensing device of claim 13, wherein the die comprises a gas sensing chip.

17. The optical sensing device of claim 16, wherein the die comprises a thermopile chip.

18. The optical sensing device of claim 13, wherein the light guiding structure comprises a light permeable body and a reflecting layer disposed on an outer surface of the light permeable body, and the light beam is reflected by the reflecting layer inside the light permeable body.

19. The optical sensing device of claim 13, further comprising a connection structure connecting the reflecting structure to the light guiding structure.

20. The optical sensing device of claim 13, further comprising a cover disposed over the light guiding structure, wherein the reflecting structure is protruded from the cover toward the die.

* * * * *